United States Patent [19]

Rodrigues et al.

[11] Patent Number: 5,355,955
[45] Date of Patent: Oct. 18, 1994

[54] CEMENT SET RETARDING ADDITIVES, COMPOSITIONS AND METHODS

[75] Inventors: Klein A. Rodrigues; Jiten Chatterji, both of Duncan, Okla.

[73] Assignee: Halliburton Company, Duncan, Okla.

[21] Appl. No.: 85,362

[22] Filed: Jul. 2, 1993

[51] Int. Cl.$^5$ .............................. E21B 33/138
[52] U.S. Cl. .................. 166/293; 106/725; 106/728; 106/823
[58] Field of Search ............... 166/293; 106/724, 725, 106/728, 823

[56] References Cited

U.S. PATENT DOCUMENTS

| | | | |
|---|---|---|---|
| 3,956,140 | 5/1976 | Nahm et al. | 166/293 X |
| 4,036,659 | 7/1977 | Stude | 106/725 X |
| 4,500,357 | 2/1985 | Brothers et al. | 166/293 X |
| 4,557,763 | 12/1985 | George et al. | 166/293 |
| 4,585,853 | 4/1986 | Plank et al. | 528/227 |
| 4,657,593 | 4/1987 | Aignesberger et al. | 252/312 |
| 4,666,979 | 5/1987 | Plank et al. | 528/227 |
| 4,674,574 | 6/1987 | Savoly et al. | 166/293 |
| 4,703,801 | 11/1987 | Fry et al. | 166/293 |
| 4,818,288 | 4/1989 | Aignesberger et al. | 252/312 |
| 4,941,536 | 7/1990 | Brothers et al. | 166/293 |
| 5,028,271 | 7/1991 | Huddleston et al. | 166/293 X |
| 5,035,812 | 7/1991 | Aignesberger et al. | 526/264 |

FOREIGN PATENT DOCUMENTS

0078938  5/1983  European Pat. Off. .

OTHER PUBLICATIONS

"Well Cementing" Edited by Erik B. Nelson (Developments in Petroleum Science, 28) Elsevier (1990).

*Primary Examiner*—George A. Suchfield
*Attorney, Agent, or Firm*—Robert A. Kent; C. Clark Dougherty, Jr.

[57] ABSTRACT

The present invention provides set retarding additives, set retarded hydraulic cement compositions including such additives and methods of using the cement compositions for cementing zones in wells. The set retarding additives are graft copolymers or terpolymers comprised of the condensation polymer product of a ketone, aldehyde and a compound which introduces acid groups into the polymer having grafted thereto a monomer selected from the group consisting of acrylic acid, vinyl phosphonic acid, methacrylic acid, maleic acid and itaconic acid or one of the foregoing monomers and a second monomer of 2-acrylamido-2-methylpropane sulfonic acid.

6 Claims, No Drawings

CEMENT SET RETARDING ADDITIVES, COMPOSITIONS AND METHODS

BACKGROUND OF THE INVENTION

1. Field of the Invention

The present invention relates generally to set retarded hydraulic cement compositions and methods of their use, and more particularly, to additives for retarding the set of hydraulic cement compositions and methods of using the resulting compositions for cementing subterranean zones in oil, gas and water wells.

2. Description of the Prior Art

Hydraulic cement compositions are utilized for carrying out a variety of operations in oil, gas and water wells including, but not limited to, completion operations such as primary cementing and remedial operations such as squeeze cementing. Primary cementing involves the placement of a hydraulic cement composition into the annular space between the walls of a well bore and the exterior of a pipe such as casing disposed therein. The cement composition is pumped into the annular space and allowed to set into an annular cement sheath therein whereby the pipe is bonded to the walls of the well bore by the set cement.

Squeeze cementing techniques usually involve the method of preventing undesirable movement of oil, gas or water through small holes or cracks in pipe disposed in the well bore; holes, cracks, voids or channels in the annular cement sheath between the pipe and the well bore; annular spaces between the cement sheath and the pipe or the walls of the well bore and permeable zones or fractures in subterranean formations. Such holes, cracks, etc. are plugged by squeezing hydraulic cement compositions therein which harden and form impermeable plugs.

Frequently, high temperatures are encountered in deep subterranean zones to be cemented which can cause premature setting of cement compositions, i.e., the compositions can not be pumped for long enough times before setting to place them in the zones to be cemented. This requires the use of set retarding additives in the cement compositions which extend the setting times of the compositions so that adequate pumping time is provided in which to place or displace the compositions in desired subterranean zones.

While a variety of cement set retarding additives have heretofore been developed and utilized, the additives frequently produce erratic results in cement compositions of different component make-up and/or cause premature gelation of cement compositions in the hostile high temperature environments to which the cement compositions are subjected. The high temperatures referred to herein are temperatures up to 250° F. and higher, and the gelation referred to is the abnormal increase in viscosity of a cement composition without a significant increase in compressive strength. The increase in viscosity makes the cement composition difficult or impossible to pump even through the cement composition has not set, i.e., formed into a hard mass having compressive strength.

In addition to the above, prior art set retarding additives comprised of materials such as lignosulfonates and synthetic polymers often give erratic results and/or are expensive to produce. Thus, there is a need for improved cement set retarding additives, set retarded cement compositions containing such additives and methods of cementing zones in oil, gas and water wells. In particular, there is a need for improved set retarding additives which are relatively inexpensive, do not cause premature gelation and bring about predictable cement composition setting times.

SUMMARY OF THE INVENTION

The present invention provides improved set retarding additives, improved set retarded hydraulic cement compositions and improved methods of utilizing such compositions which meet the needs described above and overcome the shortcomings of the prior art. The improved set retarding additives of this invention are basically comprised of graft copolymers or terpolymers comprised of the condensation polymer product of an aliphatic ketone, an aliphatic aldehyde and a compound which introduces acid groups into the condensation polymer having grafted thereto an acid monomer selected from the group consisting of acrylic acid, vinyl phosphonic acid, methacrylic acid, maleic acid and itaconic acid or one of the foregoing monomers and a second monomer of 2-acrylamido-2-methylpropane sulfonic acid. A preferred such additive is comprised of the condensation polymer product of acetone, formaldehyde and an alkali metal sulfite or bisulfite, e.g., sodium sulfite having acrylic acid grafted thereto.

The improved set retarded hydraulic cement compositions of this invention are comprised of hydraulic cement, sufficient water to form a slurry and a set retarding additive as described above. The improved methods of the invention for cementing subterranean zones penetrated by well bores comprise the steps of forming a pumpable set retarded cement composition as described above, pumping the cement composition into the subterranean zone to be cemented by way of the well bore and allowing the cement composition to set therein.

It is, therefore, a general object of the present invention to provide improved cement set retarding additives, set retarded hydraulic cement compositions and methods of using such compositions in cementing oil, gas and water wells.

Other and further objects, features and advantages of the present invention will be readily apparent to those skilled in the art upon a reading of the description of preferred embodiments which follows.

DESCRIPTION OF PREFERRED EMBODIMENTS

As mentioned above, in one aspect of this invention, improved synthetic cement set retarding additives are provided which are relatively inexpensive as compared to many of the prior art set retarders, and do not cause premature cement composition gelation problems that sometimes occur when prior art set retarders are utilized at relatively high temperatures. The set retarding additives of this invention are basically comprised of the condensation polymer product of an aliphatic ketone, an aliphatic aldehyde and a compound which introduces acid groups into the polymer having grafted thereto a single monomer selected from the group consisting of acrylic acid, vinyl phosphonic acid, methacrylic acid, maleic acid and itaconic acid or having one of the foregoing monomers and a second monomer of 2-acrylamido-2-methylpropane sulfonic acid grafted thereto. In addition to being useful as cement set retarders, the additives of this invention have dispersing properties and can be used in other aqueous suspensions such as drilling fluids and the like.

The condensation polymer product preferably contains aliphatic ketones wherein the alkyl groups thereof contain from 1 to about 3 carbon atoms. The alkyl groups can be straight-chain, branched, unsaturated or saturated groups, but are preferably saturated such as, for example, methyl and ethyl. The ketones can also be substituted with one or more substituents which do not impair the condensation reaction or alter the set retarding properties of the final product. For example, the ketones can include methyl, amino, hydroxy, alkoxy or alkoxycarbonyl groups having 1 to about 3 carbon atoms in the alkyl groups. Preferred ketones are acetone, diacetone alcohol, methyl ethyl ketone, methoxyacetone and mesityl oxide. Of these, acetone is the most preferred ketone.

The aldehyde contained in the condensation polymer product can be represented by the formula R—CHO wherein R is hydrogen or an aliphatic group having from about 1 to 3 carbon atoms. For example, R can be an alkyl group or a branched or unsaturated group such as vinyl. The aldehydes can also be substituted with one or more substituents which do not interfere with the condensation reaction such as amino, hydroxy, alkoxy or alkoxy-carbonyl substituents wherein the alkyl groups have 1 to about 3 carbon atoms. Examples of suitable aldehydes are formaldehyde, acetaldehyde, methoxyacetaldehyde, aldol, acrolein, crotonaldehyde, glyoxal and glutaraldehyde. Of these, formaldehyde is the most preferred.

The compound which introduces acid groups into the condensation polymer product can contain carboxy or sulfo groups. Preferred such compounds are sulfites or organic acids with alkali metal sulfites or bisulfites being more preferred and sodium sulfite being the most preferred.

As indicated above, the monomer or monomers which are grafted onto the condensation polymer are an acid selected from the group consisting of acrylic acid, vinyl phosphonic acid, methacrylic acid, maleic acid and itaconic acid or one of the foregoing monomers and a second monomer of 2-acryl-amido-2-methylpropane sulfonic acid. Of these, acrylic acid is the most preferred.

The quantities of aldehyde, ketone and acid group introducing or contributing compound in the condensation polymer product are generally such that the mole ratio of ketone to aldehyde to acid group contributing compound is from about 1 mole of ketone to about 1 to 18 moles of aldehyde to about 0.25 to 3.0 moles of acid contributing compound. The quantity of acid monomer grafted to the condensation polymer is such that the weight ratio of the grafted monomer to the condensation polymer is in the range of from about 0.05:1 to about 5:1.

The most preferred set retarding additives of this invention are graft copolymers comprised of the condensation polymer product of acetone, formaldehyde and sodium sulfite wherein the mole ratio of acetone, formaldehyde and sodium sulfite in the polymer is about 1:1.23:0.45, and wherein the weight ratio of the grafted monomer to the condensation polymer is about 0.3:1.

In the preparation of the above described set retarding graft copolymer and terpolymers, the condensation polymer product of ketone, aldehyde and acid group introducing compound is first prepared by reacting the ketone, aldehyde and acid group introducing compound in amounts which result in the mole ratios described above in an aqueous media at a temperature in the range of from about 50° C. to about 90° C. Generally, the ketone is first added to the water followed by dissolving the acid group contributing compound in the reaction mixture. The aldehyde is then slowly added to the reaction mixture while the mixture is heated and the reaction is continued for an additional period of time.

The condensate recovered contains the polymer product. After cooling, the condensate is dissolved in additional water, and the pH of the solution is reduced by the slow addition of concentrated sulfuric acid to the solution. The reaction mixture is then maintained at a temperature in the range of from about 30° C. to about 70° C. and dissolved oxygen is removed from the solution. The acid monomer or monomers to be grafted are then added to the reaction mixture along with an initiator comprised of ferrous ammonium sulfate and hydrogen peroxide. The reaction is continued for an additional time period at a temperature in the above mentioned range until complete.

The set retarded hydraulic cement compositions of this invention are basically comprised of a hydraulic cement, sufficient water to form a slurry of the cement and a graft copolymer or terpolymer set retarding additive as described above. While various hydraulic cements can be utilized in the cement compositions, Portland cement is generally preferred, and can be, for example, one or more of the various types identified as API Classes A–H and J cements. These cements are classified and defined in *API Specification For Materials and Testing for Well Cements*, API Spec. 10A, 21st Edition dated Sep. 1, 1991, of the American Petroleum Institute, Washington, D.C. A highly useful and effective cement slurry base for use in accordance with this invention comprises API Class H Portland cement mixed with water to provide a density of from about 11.3 to about 18.0 pounds per gallon.

The water used in the cement compositions can be water from any source, provided that the water does not contain an excess of compounds which adversely react with or otherwise affect other components in the cement compositions. The water is present in a cement composition of this invention in an amount sufficient to form a slurry of the cement, preferably, a slurry which is readily pumpable. Generally, the water is present in the range of from about 30% to about 60% by weight of dry cement in the composition.

The set retarding additive described above is included in the cement compositions of this invention in amounts sufficient to delay or retard the setting of the compositions for time periods required to place the compositions in desired locations. When the cement compositions are utilized to carry out completion, remedial and other cementing operations in subterranean zones penetrated by well bores, the compositions must remain pumpable for periods of time long enough to place them in the subterranean zones to be cemented. Generally, an aqueous solution of the above described set retarding graft copolymer or terpolymer which is from about 5% to about 40% active is combined with a cement slurry in an amount whereby the graft copolymer or terpolymer is present in the resulting set retarded cement composition in an amount in the range of from about 0.1% to about 4.0% by weight of dry cement in the composition.

The thickening and set times of cement compositions are strongly dependant upon temperature, and to obtain optimum results in oil, gas and water well applications, the quantity of graft copolymer set retarding additive required to provide the necessary pumping time at the temperatures to be encountered is included in the cement composition to be utilized. Such quantity can be determined in advance by performing API thickening time tests. A variety of other additives are often included in the compositions in addition to the set retarding additives described above. Such additives are well known to those skilled in the art and are included in cement compositions to vary the composition density, increase or decrease strength, control fluid loss, reduce viscosity, increase resistance to corrosive fluids, and the like. Essentially a cement composition meeting the specifications of the American Petroleum Institute is mixed with water and other additives to provide a cement slurry appropriate for the conditions existing in each individual well to be cemented.

A particularly preferred set retarded cement composition of this invention is comprised of hydraulic cement, e.g., API Class H Portland cement, water in an amount in the range of from about 30% to about 60% by weight of dry cement in the composition and a graft copolymer set retarding additive present in the composition in an amount in the range of from about 0.1% to about 4.0% by weight of dry cement therein, the graft copolymer set retarding additive being comprised of the condensation polymer product of acetone, formaldehyde and sodium sulfite having acrylic acid grafted thereto. As mentioned above, the composition preferably also includes fluid loss control and other additives as required for the particular cementing operation to be carried out therewith.

The methods of this invention for cementing a subterranean zone penetrated by a well bore are basically comprised of the steps of forming a pumpable set retarded cement composition of this invention, pumping the cement composition into the subterranean zone by way of the well bore, and then allowing the cement composition to set therein.

In order to further describe the additives, compositions and methods of this invention and to facilitate a clear understanding thereof, the following examples are given.

EXAMPLE 1

A graft copolymer set retarding additive of the present invention was prepared as follows. 36.8 grams of acetone and 96 grams of deionized water were reacted in a reaction kettle equipped with a condenser, thermocouple, magnetic stirrer, heating mantle and a dropping funnel. 36 grams of sodium sulfite were next gradually dissolved in the reaction mixture which was then heated to a temperature of 56° C. The heating mantle was removed and the temperature was allowed to rise due to the exothermicity of the reaction. 64 grams of a 37% by weight aqueous formaldehyde solution (containing less than 1% methanol) were dropped into the reaction mixture over a period of 45 minutes. After the formaldehyde solution was added, the reaction was allowed to continue for an additional 30 minutes. The condensate recovered contained approximately 33% of the synthesized polymer, and the polymer contained acetone, formaldehyde and sodium sulfite in a mole ratio of 1:1.23:0.45.

After cooling, 15.2 grams of the 33% aqueous solution of the condensation polymer (5 grams of the polymer) was dissolved in 100 grams of deionized water. The pH of the solution was reduced to a value of 2 by the dropwise addition of concentrated sulfuric acid to the aqueous polymer solution. The resulting reaction mixture was then placed in a water bath and maintained at a temperature of 60° C. while nitrogen was bubbled through the mixture to eliminate any dissolved oxygen therein. 1.4 grams of ferrous ammonium sulfate, 1.5 grams of acrylic acid and 1.25 milliliters of a 30% by weight aqueous solution of hydrogen peroxide were added to the reaction mixture at 20 minute intervals. The reaction was then allowed to proceed at 60° C. for two hours. The resulting aqueous reaction mixture contained the synthesized graft copolymer in an amount of about 5.6% by weight of solution. The graft copolymer contained a mole ratio of acetone to formaldehyde to sodium sulfite of 1:1.23:0.45, and the weight ratio of the grafted acrylic acid to the condensation polymer was 0.3:1.

EXAMPLE 2

Various quantities of the set retarding additive produced as described in Example 1 above (a 5.6% by weight aqueous solution of the graft copolymer) were added to test samples of a base cement slurry. The base cement slurry was comprised of Lonestar Class H hydraulic cement and water in an amount of 38% by weight of dry cement. The base slurry had a density of 16.4 pounds per gallon.

The test cement composition samples containing various quantities of the set retarding additive were tested for thickening times at various temperatures in accordance with the standard API thickening time testing procedures set forth in the American Petroleum Institute publication referred to above, i.e., API Specification 10. The results of these tests are set forth in Table I below.

TABLE I

| Thickening Times of Set Retarded Cement Compositions | | | | | | |
|---|---|---|---|---|---|---|
| Amount of Set Retarding Additive in Cement Composition[1], % by Weight of Dry Cement | Thickening Times, hr:min | | | | | |
|  | 120° F. | 145° F. | 170° F. | 200° F. | 225° F. | 250° F. |
| 0.1 | 2:01 | — | — | — | — | — |
| 0.2 | 2:19 | 2:03 | 1:50 | 1:30 | — | — |
| 0.3 | 4:13 | 4:20 | 3:27 | 2:30 | — | — |
| 0.4 | — | 4:10 | 4:33 | 3:22 | — | — |
| 0.5 | — | 6:10 | 5:32 | 4:51 | 2:20 | — |
| 1.0 | — | — | — | — | 4:06 | — |
| 1.5 | — | — | — | — | 6:01 | 2:36 |

[1]Lonestar Class H cement, 38% water by weight of dry cement and set retarding additive (16.4 lb/gal).

From Table I above it can be seen that the set retarding additive of this invention produces excellent thickening times at small concentrations and at temperatures up to and including 250° F., and that the thickening time response increases as the concentration of the additive is increasased.

EXAMPLE 3

The set retarding additive prepared as described in Example 1 was tested to determine if it causes gelation, and it was compared with a prior art set retarder comprised of a copolymer of acrylic acid and 2-acrylamido, 2-methyl propane sulfonic acid. The prior art copolymer and its use as a set retarding additive are described in U.S. Pat. No. 4,941,536 issued Jul. 17, 1990.

The two set retarding additives tested were added to test samples of two different base cement slurries in amounts of 0.5% by weight of dry cement in the slurries. The gelation tests consisted of an API thickening time test at 200° F. in which the viscosities of the test cement compositions were determined initially and at 25%, 50% and 75% of the total time prior to thickening. The results of the tests and descriptions of the base cement slurries are given in Table II below.

EXAMPLE 4

The set retarding additive of the present invention was added in various quantities to test samples of a base cement slurry. The samples are tested for 24 hour compressive strengths at various temperatures in accordance with API Specification 10.

The prior art set retarding additive described above comprised of a copolymer of acrylic acid and 2-acrylamido, 2-methylpropane sulfonic acid is also tested in the same manner as the set retarding additive of the present invention. The results of the tests and the descriptions of the base cement slurries utilized are set forth in Table III below.

TABLE II

| Set Retarding Additive in Cement Composition | Gelation of Set Retarded Cement Compositions | | | | |
|---|---|---|---|---|---|
| | Thickening Time, hr:min | Initial Viscosity, cp | Viscosity at 25% of Thickening Time, Bc | Viscosity at 50% of Thickening Time, Bc | Viscosity at 75% of Thickening Time, Bc |
| Graft Copolymer of this Invention[1] | 5:02 | 2 | 2 | 6 | 6 |
| Prior Art Retarder[1] | 4:58 | 14 | 24 | 44 | 41 |
| Graft Copolymer of this Invention[2] | 4:51 | 9 | 9 | 10 | 10 |
| Prior Art Retarder[2] | 4:45 | 14 | 25 | 46 | 52 |

[1]Cement composition was Lonestar Class H cement, 33% water by weight of dry cement and 0.5% set retarding additive (17.2 lb/gal).
[2]Cement composition was Lonestar Class H cement, 38% water by weight of dry cement and 0.5% set retarding additive (16.4 lb/gal).

From Table II it can be seen that the times before thickening produced by both of the set retarding additives tested were almost identical. However, the prior art set retarder comprised of a copolymer of acrylic acid and 2-acrylamido, 2-methyl propane sulfonic acid shows strong gelation behavior as indicated by the viscosities of the cement composition containing that additive over the test periods.

The set retarding additive of the present invention, on the other hand, produced virtually no gelation, i.e., the viscosities remained relatively constant, and the cement compositions containing the additive had right angle sets. The term "right angle set" is used herein to mean that the slurry goes directly from a relatively low viscosity to a set cement having compressive strength without a substantial viscosity increase taking place in between.

TABLE III

| Set Retarding Additive in Cement Composition | Amount, % by Weight of Dry Cement | Compressive Strengths of Set Retarded Cement Compositions | | | | | |
|---|---|---|---|---|---|---|---|
| | | Compressive Strengths, psi | | | | | |
| | | 150° F. | 170° F. | 200° F. | 225° F. | 250° F. | 300° F. |
| Graft Copolymer of this Invention[1] | 0.3 | 3916 | — | — | — | — | — |
| Prior Art Retarder[2] | 0.3 | — | — | 3730 | — | — | — |
| Graft Copolymer of this Invention[1] | 0.5 | 3360 | — | — | — | — | — |
| Prior Art Retarder[2] | 0.5 | — | — | — | 4580 | — | — |
| Graft Copolymer of this Invention[1] | 1.5 | — | — | — | — | 4490 | — |
| Prior Art Retarder[2] | 1.5 | — | — | — | — | 5130 | 2370 |

[1]Cement composition was Lonestar Class H cement, 38% water by weight of dry cement, 0.1% borate treated hydroxypropylguar and set retarding additive (16.4 lb/gal).
[2]Cement composition was Lonestar Class H cement, 38% water by weight of dry cement, 0.1% borate treated hydroxypropylguar and set retarding additive (16.4 lb/gal).

As can be seen from Table III, the compressive strengths of the cement compositions tested are excellent, and the compressive strengths of the cement compositions containing the set retarded additive of the present invention are generally the same as those of the cement compositions containing the prior art set retarding additive.

EXAMPLE 5

A grafting reaction was performed whereby vinyl phosphonic acid was grafted to a condensation polymer product of acetone, formaldehyde and sodium sulfite. In the reaction, 15.2 grams of the 33% aqueous solution of the condensation polymer synthesized as described in Example 1 (5 grams of the polymer) was dissolved in 100 grams of deionized water. The condensation polymer contained a mole ratio of acetone to formaldehyde to sodium sulfite of 1:1.23:0.45. The pH of the solution was reduced to a value of 2 by the dropwise addition of concentrated sulfuric acid to the aqueous polymer solution. The resulting reaction mixture was then placed in a water bath and maintained at a temperature of 60° C. while nitrogen was bubbled through the mixture to eliminate any dissolved oxygen therein. 1.4 grams of ferrous ammonium sulfate, 2.5 grams of vinyl phosphonic acid (a 65% active aqueous solution) and 1.25 milliliters of a 30% by weight aqueous solution of hydrogen peroxide were added to the reaction mixture at 20 minute intervals. The reaction was then allowed to proceed at 60° C. for two hours. The resulting aqueous reaction mixture contained the synthesized graft copolymer in an amount of about 6.0% by weight of solution. The graft copolymer was comprised of a condensation polymer containing acetone, formaldehyde and sodium sulfite in a mole ratio of 1:1.23:0.45 having vinyl phosphonic acid grafted thereto in a weight ratio of grafted vinyl phosphonic acid to condensation polymer of 0.28:1.

EXAMPLE 6

Various quantities of the graft copolymer of Example 5 were added to test samples of a base cement slurry comprised of Lonestar Class H cement and 38% water by weight of cement (16.4 lb/gal). The test cement compositions were tested for thickening times at various temperatures. The results of these tests are given in Table IV below.

TABLE IV

Thickening Times of Set Retarded Cement Compositions

| Amount of Set Retarding Additive in Cement Composition[1], % by Weight of Dry Cement | Thickening Times, hr:min | | | |
|---|---|---|---|---|
| | 200° F. | 250° F. | 300° F. | 350° F. |
| 0.1 | 1:31 | — | — | — |
| 0.25 | 2:51 | — | — | — |
| 0.4 | 6:21 | — | — | — |
| 0.5 | 11:40 | 1:55 | — | — |
| 0.75 | — | 2:26 | — | — |
| 1.5 | — | 4:48 | 3:55 | 3:15 |
| 1.75 | — | — | — | 4:21 |

[1]Lonestar Class H cement, 38% water by weight of dry cement and set retarding additive (16.4 lb/gal). The cement compositions tested at temperatures above 200° F. also contained 35% silica flour by weight of dry cement.

The results set forth in Table IV show that the vinyl phosphonic acid graft copolymer is an excellent cement set retarder up to temperatures of 350° F. and higher and the thickening times increase linearly with concentration. The cement composition containing 1.5% by weight vinyl phosphonic acid graft copolymer was tested for compressive strength at 250° F. and 300° F. The results were 5130 psi and 2130 psi, respectively, which are excellent compressive strengths.

EXAMPLE 7

A methacrylic acid graft copolymer of this invention was prepared by dissolving 5 grams of an acetone-formaldehyde-sodium sulfite condensation polymer having an acetone-formaldehyde-sodium sulfite mole ratio of 1:2.85:0.5 in 100 grams of deionized water and adjusting the pH to 2 by the slow addition of sulfuric acid. The mixture was placed in a 60° C. water bath and purged with nitrogen. 1.4 grams of ferrous ammonium sulfate, 5 grams of methacrylic acid and 1 milliliter of a 30% by volume hydrogen peroxide solution was added at 20 minute intervals. The reaction was allowed to proceed for 2 hours. The resulting aqueous reaction mixture contained the graft copolymer in an amount of 9.0% by weight of solution and the graft copolymer contained a weight ratio of methacrylic acid to condensation polymer of 1:1.

A cement composition comprised of Lonestar Class H cement, 0.5% of the methacrylic acid graft copolymer set retarder by weight of cement and 38% water by weight of cement (16.4 lb/gal) was prepared. The cement composition was tested for thickening times at 145° F. and 200° F. which were 4 hr: 35 min. and 1 hr: 42 min., respectively.

EXAMPLE 8

The graft copolymer preparation procedure of Example 7 was repeated except that the condensation polymer contained acetone, formaldehyde and sodium sulfite in a ratio, respectively, of 1:1.23:0.45, 1.5 grams of methacrylic acid were used (resulting in methacrylic acid-condensation polymer weight ratio of 0.3:1) and 1.25 milliliters of hydrogen peroxide were used.

A cement composition containing Lonestar Class H cement, 0.5% of the methacrylic acid graft copolymer by weight of cement and 0.38% water by weight of cement (16.4 lb/gal) had a thickening time of 3 hr: 18 min. at 200° F.

EXAMPLE 9

A maleic acid graft copolymer of this invention was prepared as described in Example 8 above except that the pH of the reaction solution was not changed, 1 gram of ferrous sulfate was used instead of 1.4 grams of ferrous ammonium sulfate and 1.5 grams of maleic acid was used (resulting in maleic acid-condensation polymer weight ratio of 0.3:1).

A cement composition containing Lonestar Class H cement, 0.5% of the maleic acid graft copolymer by weight of cement and 38% water by weight of cement (16.4 lb/gal) had a thickening time of 2 hr: 18 min. at 200° F.

EXAMPLE 10

An itaconic acid graft copolymer of this invention was prepared as described in Example 9 except that 1.5 grams of itaconic acid was used instead of maleic acid. A cement composition as described in Example 9 containing itaconic acid graft copolymer instead of the maleic acid graft copolymer had a thickening time of 2 hr: 48 min. at 200° F.

EXAMPLE 11

An itaconic acid, 2-acrylamido-2-methylpropane sulfonic acid graft terpolymer of this invention was prepared by dissolving 5 grams of an acetone-formaldehyde-sodium sulfite condensation polymer having a mole ratio of 1:2.85:05 in 50 grams of deionized water. The pH of the solution was reduced to 2 using concentrated sulfuric acid, and nitrogen was then bubbled through the solution. The reaction mixture was placed in a 60° C. water bath and 1 gram of ferrous sulfate, 3 grams of itaconic acid, 4 grams of 2-acrylamido-2-propane sulfonic acid and 1.25 ml of hydrogen peroxide were added at twenty minute intervals. The reaction was allowed to proceed for 2 hours. The resulting aqueous reaction mixture contained the graft terpolymer in an amount of 19.4% by weight of solution.

A cement composition comprised of Lonestar Class H cement, 0.5% of the above described graft terpolymer set retarder by weight of cement and 38% water by weight of cement (16.4 lb/gal) was prepared. The cement composition was tested for thickening time at 200° F. which was 5 hr: 35 min.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of cementing a subterranean zone penetrated by a well bore comprising the steps of:

forming a pumpable cement composition comprised of hydraulic cement, sufficient water to form a slurry, and a water soluble additive consisting of a polymer having grafted thereto at least one acid monomer selected from the group consisting of a first acid monomer or said first acid monomer and a second acid monomer wherein:

said polymer is the condensation polymer product of an aliphatic ketone, an aliphatic aldehyde and an acid contributing compound wherein the molar ratio of said ketone to said aldehyde to said acid contributing compound in said polymer is in the range of from about 1 mole of said ketone to about 1 to 18 moles of said aldehyde to about 0.25 to 3.0 moles of said acid contributing compound; said first acid monomer is selected from the group consisting of acrylic acid, vinyl phosphonic acid, methacrylic acid, maleic acid and itaconic acid and said second acid monomer is 2-acrylamido-2-methylpropane sulfonic acid; the weight ratio of said acid monomer to said polymer in said additive is in the range of from about 0.05 to 1 to about 5 to 1;

pumping said cement composition into said zone by way of said well bore; and allowing said cement composition to set.

2. The method of claim 1 wherein said aliphatic ketone contains from 1 to about 3 carbon atoms in the alkyl group thereof; said aliphatic aldehyde is represented by the formula RCHO wherein R is hydrogen or an aliphatic group having from 1 to 3 carbon atoms; and said acid contributing compound contains carboxyl or sulfo groups.

3. The method of claim 2 wherein said aliphatic ketone is selected from the group consisting of acetone, diacetone alcohol, methyl ethyl ketone, methoxyacetone and mesityl oxide; said aliphatic aldehyde is selected from the group consisting of formaldehyde, acetaldehyde, methoxyacetaldehyde, aldol, acrolein, crotonaldehyde, glyoxal and glutaraldehyde; and said acid contributing compound is an alkali metal sulfite or bisulfite.

4. The method of claim 3 wherein said polymer is the condensation polymer product of acetone, formaldehyde and sodium sulfite having grated thereto an acid monomer selected from the group consisting of acrylic acid, vinyl phosphonic acid and methacrylic acid.

5. The method of claim 4 wherein said molar ratio is about 1 to 1.23 to 0.45 and said weight ratio is about 0.3 to 1.

6. The method of claim 5 wherein said acid monomer is acrylic acid.

* * * * *